March 22, 1966 G. A. BAALSON 3,241,252

ORBITAL ATTACHMENTS FOR TERRESTRIAL GLOBES

Filed April 23, 1963 2 Sheets-Sheet 1

INVENTOR

George A. Baalson

George A. Baalson
Inventor

ORBITAL ATTACHMENTS FOR TERRESTRIAL GLOBES

Filed April 23, 1963 2 Sheets-Sheet 2

INVENTOR

George A. Baalson

United States Patent Office 3,241,252
Patented Mar. 22, 1966

3,241,252
ORBITAL ATTACHMENTS FOR TERRESTRIAL GLOBES

George A. Baalson, Sylvan Dells, Tower, Minn.
Filed Apr. 23, 1963, Ser. No. 275,119
5 Claims. (Cl. 35—46)

This invention relates to the space age, and more particularly to apparatus which is attached to terrestrial globes and their mounting for the purpose of visualizing a satellite as it circles the earth.

Considering that the world is just entering the age of space, it seems important that the student, the teacher, and the average citizen should be provided with reasonably simple devices to give a better understanding of the very complex scientific problems and principles involved in explaining the action of a body in space orbiting the earth. It is felt that the invention herein described will to some extent fill the need for such a device.

It is, therefore, the principal object of this invention to provide apparatus in the form of orbital attachments for terrestrial globes that will permit the visualization of the flight of a satellite around the earth.

Another object of this invention is to provide orbital attachments for terrestrial globes that will permit classroom instruction in the calculation of the position of a satellite as it circles the earth.

Another object of this invention is to provide orbital attachments for terrestrial globes that will permit and aid in the visual tracking of a satellite as it circles the earth.

Another object of this invention is to provide orbital attachments for terrestrial globes that permits one to determine exactly what part of the earth a satellite may be above at any given moment as it circles the earth.

Still another object of this invention is to provide orbital attachments for terrestrial globes that will permit an observer to compute several of the orbital elements of an unknown orbiting object after visual observations involving at least two separate fixes of position involving bearing and elevation.

From the preceding, it is seen that the invention has as its objects, among others, the provision of orbital attachments for terrestrial globes of the character described which is of simple and economical construction and which can be employed to meet the requirements indicated above. Because of the importance of determining the relative position of the sun to the orbit of a satellite, the structure of the attachments involved in the present invention will of necessity include some elements in common use for a long period of time, that demonstrate and explain the seasonal changes in the relative position of the sun and the earth. However, the present device combines these structures in a novel manner with elements used, in new combinations and interrelations to solve some of the problems met by the average citizen, as well as the student and scholar, who is interested in the fascinating hobby of watching satellites cross the sky-ways overhead.

A satellite watcher is primarily interested in the time and position, or "look angle" at which a satellite will appear; hence the invention provides a time cap or other indicia of universal time, attached to the globe. Also a protractor so oriented and so computed as to size, that when it is used in conjunction with orbit representing ring and instant orbit data, it will enable the observer to predict the satellite position as to angle of elevation and azimuth during the entire time of the visual passage. To help determine the time lapse from ascending node to the time of expected observation, the invention includes divisions of geocentric arc on its orbit representing ring or loop. And to help determine whether or not a satellite will be visible, a sun pointer is provided which, when used with a properly-oriented globe assembly, will help indicate the possibility of illumination of the satellite for visual observation.

Other objects and uses of the invention will become apparent from the following description.

Referring to the drawings for a more detailed description:

Similar reference characters refer to similar parts throughout the several views of the drawing.

Figure 1:
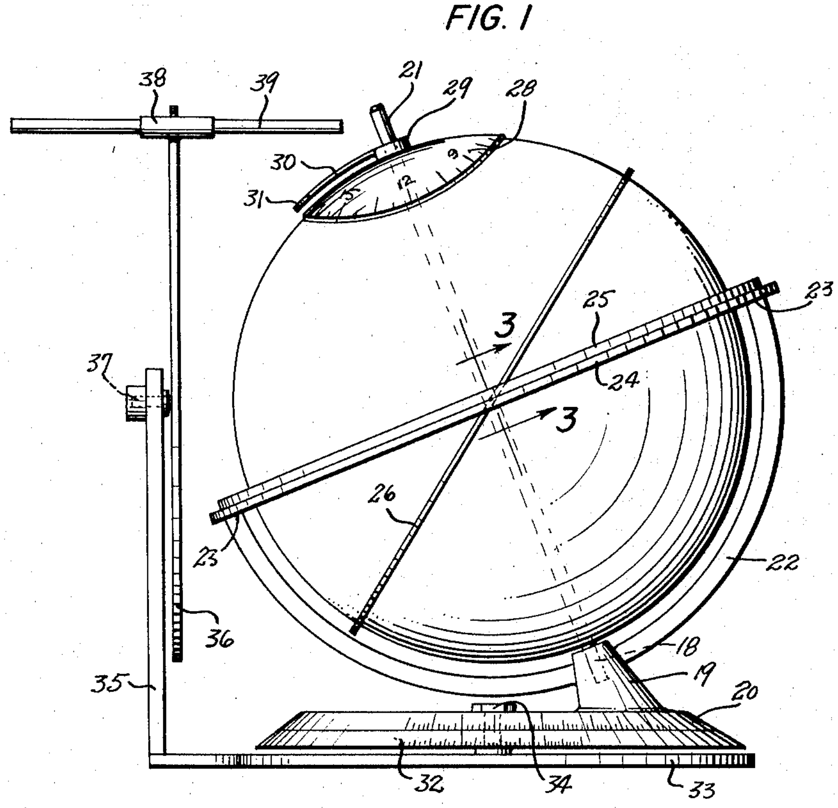
FIGURE 1 is a side view of this invention secured to a terrestrial globe.
Figure 3:
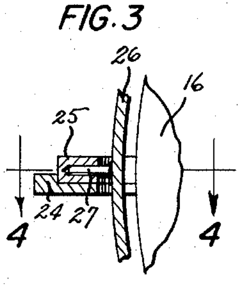
FIGURE 3 is a cross-section taken along lines 3—3 of FIGURE 1.
Figure 4:
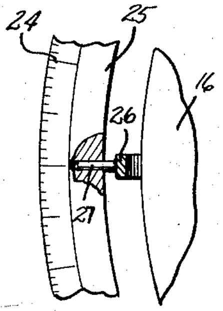
FIGURE 4 is a cross-section taken along lines 4—4 of FIGURE 3.
Figure 5:
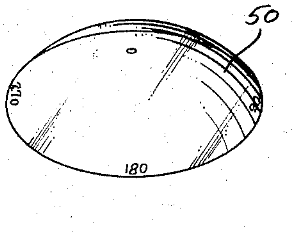
FIGURE 5 is a picture view of protractor.

Having reference now to the drawing in detail, there is generally indicated by character 16, a terrestrial globe having a centrally located supporting shaft 17 extending through the center thereof, and set at an angle of about 23½ degrees from the vertical, with the lower end 18 being supported by the angularly disposed hub 19 of the circular member 20, said globe mounting so positioned that it will bring the center of the terrestrial globe directly over the center of circular member 20. The upper end 21 of the shaft 17 projects out beyond the top of the aforesaid terrestrial globe 16 for a purpose described in detail later on in this specification. A circular ring sector 22 is carried by the aforesaid hub 19. The ends 23 of the circular ring sector support the equatorial ring 24 in which loosely nests orbit ring 25, on which is pivotally mounted the orbital loop 26 by means of pins 27, one of which is located diametrically opposite the other one as can be seen on examination of FIGURE 2 of the appended drawing. A cap 28 having centrally located opening therein through which projects the upper end of shaft 17 is located on the top of aforesaid terrestrial globe 16. A collar 29 having a curved arm 30 terminating in a pointer 31 is swingably mounted on the aforesaid upper end 21 of shaft 17.

Looking again at FIGURE 1, it will be seen that the aforesaid circular member 20 is mounted on the top of a second circular member 32 which, in turn, is supported on a flat base 33 by means of a centrally located pin 34, that also passes thru the center of the aforesaid circular member 20 which has a beveled periphery that is in alignment with the beveled periphery of the circular member 32; to the aforesaid base 33 is secured the vertically mounted support 35, on which is rotatably mounted sun disk 36 by means of a horizontally disposed shaft 37. A holder 38 mounted on the periphery of the aforesaid sun disk 36 supports the horizontally disposed pointer 39 that is best shown in FIGURE 1 of the appended drawing.

The construction of one form of this invention has now been described with the exception of the graduations on its various elements, which will be stated as the description of its use proceeds, which is herein given as follows:

On the equatorial ring 24 are inscribed two concentric calibrated circles: The inner circle, called the SHA circle, as calibrated in degrees clockwise to indicate siderial hour angle positions of celestial bodies, including that of the sun; zero point on this circle would represent the position of the sun at the vernal equinox on March 21. The outside circle, called the day circle, is divided into segments representing the days of the year, sequence of days and months being counter-clockwise starting with the line for March 21 coinciding with zero line for SHA. Position for each day of the year was determined by noting the siderial hour angle of the sun at midnight for each day during the year 1962, and placing the gradation for that day directly opposite the appropriate point on the SHA circle. Thus, while March 21 was at zero SHA, March 22 was located opposite 359:11 degrees SHA and March 23 at 358:17 degrees SHA. Referring now to FIGURE 1, the lowest point of the aforesaid ring 24 is at the left, and assuming it is set for June 22, a vertical diameter of the sun disk 36 would be directly opposite June 22 on the day circle and that 270 degree mark on the SHA circle. A corresponding SHA circle is also imprinted on circular member 20 and a day circle is imprinted on circular member 32. If a reference point or line is inscribed on base 33 directly under the center of shaft 37 and terminating at the periphery of circular member 32, then it is very convenient to set the globe assembly into position for any day of the year by rotating it on its base until the desired date is at the point of reference. For illustration, in a later discussion, the globe is to be set to proper position for Echo I on July 17, 1962. The globe assembly was rotated on its base until July 17 on member 32 was opposite the reference point on base 33 as above.

The orbital ring 25 that controls the position of the orbital loop 26 has three reference points; namely, first, the AN or point of ascending node (also the point for mounting the aforesaid orbital loop 26); second, SHA of orbit located 90 degrees counter-clockwise from AN; and third, DN located 180 degrees from AN, and representing position of descending node, also another pivotal point for the mounting of orbital loop 26.

Reference point SHA of orbit represents the direction in space of a line thru the center of the earth and perpendicular to an imaginary plane of the orbit at the time in question. Actually, since the orbit is continually changing in space, such a plane does not exist; however, since the aforesaid orbital loop 26 does lie in a plane, it is convenient for explanatory and instructional purposes to consider the orbit as lying in a plane for at least one orbit. SHA of orbit would be 90 degrees counter-clockwise from SHA of AN; if, in a case where SHA of AN is 35 degrees, SHA of the orbit would be 305 degrees.

Figure 2:
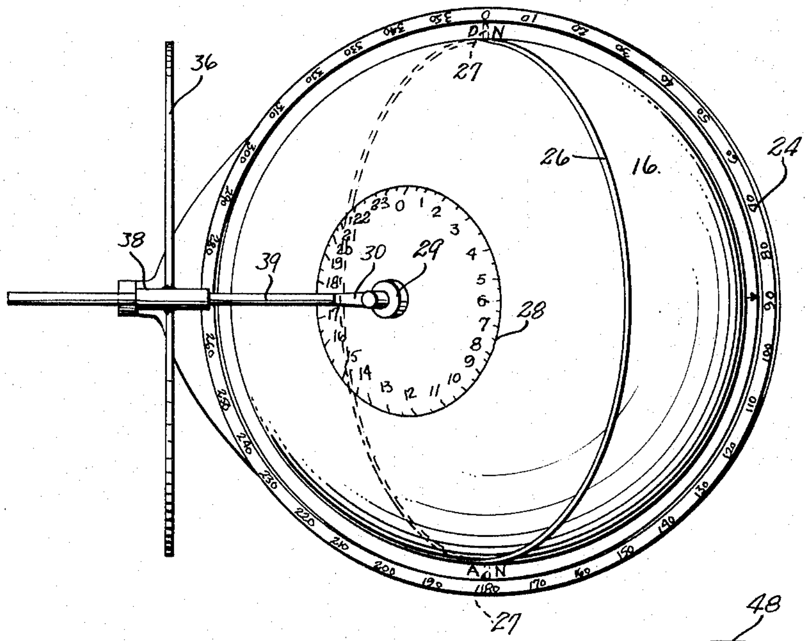
FIGURE 2 is a top view of FIGURE 1.

Time designating cap 28 is constructed of a spherical surface and is attached to the north pole of the aforesaid terrestrial globe 16, with the upper end 21 of shaft 17 passing thru its center as clearly shown in FIGURES 1 and 2 of the appended drawings. The cap is calibrated to represent 24 hours of universal time. The said cap can be made movable to represent local time, but is preferably attached rigidly with the zero point on the 180th meridian of the globe, thus representing universal time which is used as basis for data on orbital elements. Pointer 31 is used to represent the position of the sun at the time under consideration. In use, if the SHA of the sun is at 234, rotate globe 16 until some convenient meridian is opposite SHA 234 on equatorial ring 24; then move pointer 31 to line up with the aforesaid meridian.

If it is so desired, the graduations in SHA may be replaced on the equatorial ring 24 by the term RA (right ascension) with proper changes in direction of progression. Other time designating devices can, of course, be used; it is quite possible to imprint elements of universal time near the equator or some other parallel near it; when the system is used, the aforesaid pointer 31 can be mounted on a clip and positioned on the aforesaid equatorial ring 24. For instance, if the SHA of the sun on day of observation is 234, place the clip (not shown in the appended drawing) at the point.

Figure 8:
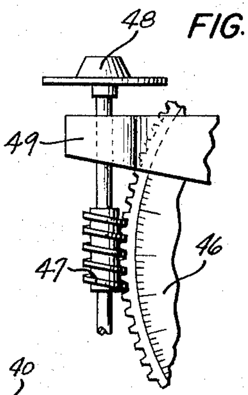
FIGURE 8 is a cross-section taken along lines 8—8 of FIGURE 7.
Figure 7:
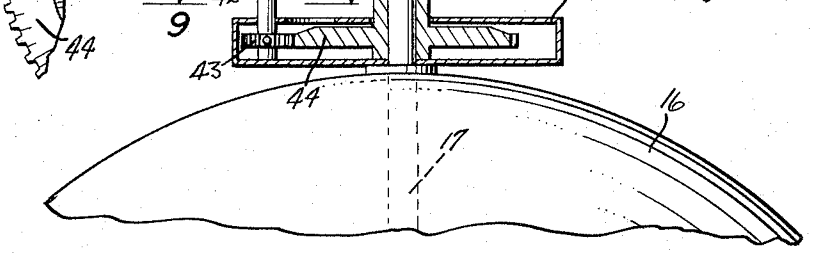
FIGURE 7 is a vertical sectional view of an optional form of construction of this invention.
Figure 9:
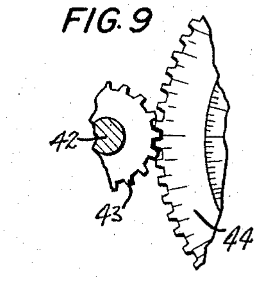
FIGURE 9 is a cross-section taken along lines 9—9 of FIGURE 7.

An alternate form of this invention is illustrated in FIGURES 7, 8, 9. Looking first at FIGURE 7, it will be seen that a hollow cylindrical element 40 is suitably attached to the aforesaid terrestrial globe 16. A control dial 41, graduated in minutes of time is mounted on shaft 42 that passes thru the center of pinion gear 43 that is in engagement with gear 44, which is calibrated in hours of universal time as in the case of the aforesaid cap 28. Gear 44 has its center rigidly secured to the vertically disposed tubular shaft 45, which rotates about the aforesaid upper end 21 of shaft 17. A large gear 46 parallel and above gear 44, is attached to the upper end of the aforesaid tubular shaft 45, and is calibrated in degrees of SHA. A smaller gear 47 engages the aforesaid gear 46 and is attached to the calibrated SHA control dial and knob 48. The gear 47 and the control dial and knob 48 are supported by the bar 49 which is attached to the uppermost end 21 of the aforesaid shaft 17. In actual use, calibrated dials 46 and 48 are set for the SHA of the sun at time of the observation or computation, dial 41 is actuated so as to bring the reference point for it and the dial on top of gear 44 into proper relation to the graduations that represent time; these movements will turn globe 16 into proper position for the time and date involved.

Other measuring and time indicating devices may be used, but those heretofore mentioned and illustrated in the appended drawings indicate enough variety for most occasions.

To indicate path of a satellite with reference to an observer or to any spot on the globe, a protractor 50 is provided; in order to fit snugly over a curved surface the protractor must be made of a spherical surface section to fit the globe in use. This protractor is calibrated clockwise in degrees to indicate bearing, beginning with zero at North, 90 at East, etc. Size of protractor can vary depending on size of globe, and type of observations or computations planned. For a 12" globe, a protractor of 4.125 inches in diameter will very closely approximate a sighting angle of 20 degrees above the horizon for a satellite 900 miles above the earth's surface. For instance, if Echo I is at a height of 900 miles at time of a proposed sighting, and orientation of the orbit loop 26 as hereinafter described indicates that the loop will cross the periphery of said protractor at say 231 and 78 degrees, then an observer could expect to see Echo I at a sighting angle of 20 degrees above the horizon at those two compass points (assuming, of course, illumination of satellite, clear sky, and observer in sufficient darkness). For other heights, a simple diagram would show that the sighting angle for a satellite at 1000 miles would be about 22 degrees, for 550 miles height, it would be about 10 degrees, etc.

Figure 6:
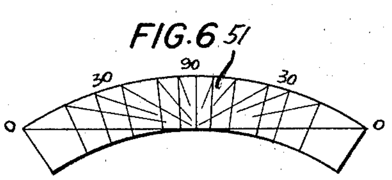
FIGURE 6 is a top view of one detail of this invention.

Arcs of circles concentric to globe in use are very helpful in demonstrating and computing altitude and elevation. For example, the space between two concentric circles of radius 6 inches and 7½ inches may be designated by the number 51 as shown in FIGURE 6 to represent an orbit of 1000 miles up when used with a 12 inch globe. From the center of the smaller arc and tangent to its circle a straight line terminated by the circumference of the larger circle will represent the horizontal of the observer. From the center of said tangent line, other lines can be drawn to represent elevations of 0 to 90 degrees as shown. Where these elevation lines are terminated by the larger circle, lines are drawn toward the center of the circles, and terminated by the circumference of the smaller circle; these lines are used to indicate point at which an observed satellite would be directly overhead.

To determine approximate location of orbit in relation to observer, or in respect to any point on earth, proceed as follows:

The first step is to rotate the globe assembly on its axis bearing 34 so as to correspond to the date; as an illustration for July 17, set indicia on day circle 32 for said date opposite reference point inscribed on base 33. It will now be found on referring to equatorial ring 24 that the date July 17 on the day circle, and 244 on the SHA circle are directly opposite a diameter on sun disk 36. Previous computation indicated that Echo I would cross the meridian of the observer at about 6:58 u.t. Height was indicated at about 900 miles for the first sighting in the West at about an elevation of 20 degrees.

Observer will need to know SHA of orbit or of AN. If RA of ascending node is known, find SHA by subtracting from 360, then set AN (as found on circle 25) opposite desired calibration on equatorial ring 24. For instance, the SHA of AN for Echo I on July 17, 1962 was 184. Next move orbit loop 26 to inclination of orbit, which was about 47 degrees. If time of intended observation is 7 u.t., set arrow 31 to point of SHA of sun (as heretofore explained) which on July 17 was 244, and turn the globe until arrow 31 points to 7th hour on disk 28. Then place protractor 50 on globe with center at point of observer and 0 and 180 on meridian of observer. If the orbit loop crosses any part of the protractor it indicates the satellite may be visible. Bearings at which loop crosses protractor indicate approximate points of sighting on rising and setting satellite. Point on loop nearest center of protractor indicates highest elevation for that observation. To determine expected elevation use arc 51 which for Echo I was computed at approximately 900 miles; set the arc 51 with center at point of observer and move arc so as to cross loop 26 at various points, then inspection of lines will indicate elevation at any desired point where arc 51 crosses loop.

As a result of the action just described, it was found that the orbit crossed the periphery of protractor 50 at bearing 277, and here the elevation of the satellite would be about 20 degrees.

Other estimates were obtained by inspection as follows:

| Bearing: | Elevation |
|---|---|
| 258 | 40 |
| 230 | 48 |
| 210 | 50 |
| 180 | 47 |
| 160 | 35 |
| 140 | 20 |

More accurate estimates could be obtained by taking into account the rotation of the earth; since the globe ball rotates on its axis independent of other elements, it is fairly easy to compute more accurate look angles especially for faint satellites that are not visible to the naked eye, and hence require precise settings of tracking scopes.

To determine whether the sun's rays will illuminate the satellite, slide pointer rod 39 in bearing 38 across globe until it meets arc of type 51 when said arc is placed along loop 26, with its surface perpendicular to the surface of the globe at point of contact. If pointer passes above the arc, it will indicate that at that point the rays of the sun will not illuminate the satellite. However, any point at which the pointer meets the arc will be illuminated, and thus at this point the satellite will be visible if it reflects enough light and the observer is in sufficient darkness.

In the above action, just described, the pointer touched the arc at all points, so it indicated the satellite would be illuminated for the entire period.

This device can also be used to compute approximate SHA of the orbit of an unknown body provided the observer can obtain two fairly accurate fixes of elevation and bearing. Again use protractor 50 with center at point of observation, note the two bearings and, with the globe set for correct time, slide ring 25, and move loop 26 so as to come as close as possible to bearings observed. If several arcs have been constructed for various elevations of orbit a fairly close approximation can be worked out for some of the elements of the orbit. With figures as found, estimate time for next orbit, turn globe to estimated time and determine if orbit will be within sighting distance. A second sighting should give enough information for fairly close computation.

In accordance with the provisions of the United States patent statutes, as stated in the United States Code Title 35, Patents, I have now described the principle of construction and operation of my invention of Orbital Attachments for Terrestrial Globes in the form which I personally consider the best embodiment thereof; however, it will be understood that various omissions and substitutions and changes in its operation and structure may be made by those skilled in the art without departing from the spirit of the invention; and what I now claim as my invention and desire to secure by Letters of Patent is:

1. A satellite demonstrating and computing device as heretofore described, comprising a terrestrial globe rotatably mounted by means of an angularly disposed axis and off-center on circular members which members in turn are rotatably mounted on a flat base through suitable bearings; and the said flat base having a vertically-disposed member on which is mounted a sun disk having a sliding sunray pointer at right angles to its periphery, which sunray pointer can be slid over the horizon of the globe; and a pair of rings spaced near the surface of and encompassing said globe at the equator, one of said pair of rings being a fixed equatorial ring calibrated in siderial hour angle of the sun and the second ring nesting loosely in said equatorial ring and supporting a pivotally-mounted orbit loop graduated in geocentric arc and also encompassing the globe; structure supporting said rings; and a graduated universal time-indicating device attached to said globe with a movable reference point attached to globe axis; and a protractor attachable to said globe, the movable structures and indicia so computed and correlated that when used in combination with minimum orbit element data will enable an observer to demonstrate and roughly compute the position of a satellite and its orbit upon the globe at any given time.

2. An invention of the character described, comprising a terrestrial globe mounted on a shaft extending through the said terrestrial globe with the lower end secured into an angularly disposed hub secured to the top of a circular member mounted on a like circular member that is rotatably mounted on a flat base, the flat base having a vertically-disposed member on which is rotatably mounted a sun disk having mounted at a right angle on its periphery a bearing holding loosely a sun ray pointer that can be slid over the horizon of the globe and beyond to indicate path of sun's rays so as to determine the possibility of illumination of a satellite at various points as it moves in its orbit around the earth; a pair of rings, one of which nests partly in the other rings, the said rings encompassing the globe, and the said rings being supported by each end of a circular ring sector that in turn is supported by the said angularly-disposed hub, and a loop that also encompasses the said terrestrial globe, the said loop being rotatably supported by a pair of pins adapted to one of the said rings, one pin being diametrically opposite the other pin and a graduated circular cap mounted on the upper part of the globe, the said rings and circular members having indicia thereon providing means of locating the position of a satellite and its orbit in relation to any point on the terrestrial globe, and to determine at what points the satellite would be sufficiently illuminated for visual observation.

3. An invention of the character described, comprising a terrestrial globe rotatably mounted on a shaft extended through the said terrestrial globe with the lower end secured into an angularly disposed hub mounted on the top of a circular member and off center of the said circular member mounted on a like circular member that is rotatably mounted through suitable center bearing to a flat base which has a vertically-disposed member on which is rotatably mounted a sun disk having a pointer secured at right angles to its periphery, and a pair of rings encompassing said globe, one of which nestles partly in the other ring, the said rings being supported by each end of a circular ring sector that in turn is supported by the said angularly disposed hub, and an orbital loop graduated in arcs of geocentric angles that also encompasses the said terrestrial globe, the said loop being supported by a pair of pins adapted to one of the said rings, one pin being diametrically opposite the other pin, and attached to the upper part of said globe a circular cap with the upper end of said shaft extending loosely through the center of said circular cap, and a pointer swingably mounted on the same upper end of said shaft, the said pointer terminating over and acting as reference point to graduations of universal time on said circular cap, said graduations of time and of geocentric angles on the orbit loop providing the means, when combined with interrelated structure and graduations of other members of the device, for estimating and computing the time at which a satellite will pass over any part of the globe.

4. An invention of the character described, comprising a terrestrial globe rotatably mounted on a shaft extending through said terrestrial globe with the lower end projecting into an angularly disposed hub secured to the top of a circular member and off center of the said circular member, said circular member being mounted on a like circular member that is rotatably mounted on a flat base through a suitable bearing, the said flat base has a vertically-disposed member on which is rotatably mounted a sun disk having mounted at a right angle on its periphery a bearing holding loosely a sun ray pointer that can be slid over the horizon of the globe, and beyond, to determine the possibility of illumination of a satellite at various points as it moves in its orbit around the earth, a pair of rings, one of which nests partly inside the other ring, said inside ring being rotatable and bearing reference indicia of ascending node, descending node, and SHA of orbit, and the said outer ring, or equatorial circle being attached to and supported by each end of a circular ring sector that in turn is supported by the said angularly disposed hub, and a loop that encompasses the said terrestrial globe, the said loop being graduated in arcs of geocentric angle, said loop being supported by a pair of pins adapted to one of the said rings, one pin being diametrically opposite the other pin, and a graduated circular cap mounted on the top of the globe with said shaft extending out through the top of the terrestrial globe and passing loosely through the center of said graduated circular cap, and a pointer swingably mounted on the same upper end of said shaft, and terminating above the graduations on the said circular cap, and a protractor that can be placed on the globe with center at point of observer, or point of interest, said protractor so computed that its size bears a definite relation to the height of a satellite above the earth thereby being a means by which the observer can estimate or compute the elevation look-angle, as well as the azimuth of a satellite within the visible range of the observer.

5. An invention of the character described, comprising a terrestrial globe rotatably mounted on a shaft extending through the said terrestrial globe with the lower end projecting into an angularly disposed hub mounted on the top of a circular member and off-center of the said circular member mounted on a like circular member that is rotatably mounted through suitable center bearing to a flat base which has a vertically disposed member on which is rotatably mounted a sun disk having mounted at a right angle on its periphery a bearing holding loosely a sun ray pointer that can be slid over the horizon of the globe, and beyond, to determine the possibility of illumination of a satellite at various points as it moves in its orbit around the earth, a pair of rings encompassing said globe one of which rings nests partly inside the other ring, said inside ring being rotatable and bearing reference indicia and the said outer ring or equatorial circle being attached to and supported by each end of a circular ring sector that in turn is supported by the said angularly disposed hub, and a loop that encompasses the said terrestrial globe, the said loop being graduated in arcs of geocentric angle said loop being supported by a pair of pins adapted to the inside rotatable ring, and a graduated mechanism embodying a hollow cylindrical element attached to the top of said terrestrial globe, inside of which cylindrical element is rotatably mounted a gear attached to an angularly disposed tubular shaft which in turn is rotatably mounted on the upper end of the said shaft that extends out of the top of said terrestrial globe, and a pinion gear in mesh with the first mentioned gear, said pinion gear being mounted on a shaft having a graduated control knob and dial on its upper end, the said shaft being mounted through suitable bearings on the upper and lower walls of said hollow cylindrical element, and a second large gear mounted on the upper end of said angularly disposed tubular shaft which gear in turn is in mesh with a second pinion gear fitted with control dial and supported by a bar extending outward from and attached to the shaft that extends out of the top of said terrestrial globe, and a protractor that can be placed on the globe with the center at the point of the observer, said protractor being so computed that its size bears a definite relation to the height of a satellite above the earth, thereby being a means by which an observer can estimate or compute the elevation look-angle as well as the azimuth of a satellite within the visible range of the observer.

References Cited by the Examiner

UNITED STATES PATENTS

| | | | |
|---|---|---|---|
| 29,755 | 8/1860 | Barnard | 35—46 X |
| 255,491 | 3/1882 | Costello | 35—45 |
| 263,886 | 9/1882 | Fitz | 35—46 |
| 1,836,423 | 12/1931 | Wright | 35—46 |
| 1,877,306 | 9/1932 | Hanses | 35—46 |
| 1,986,576 | 1/1935 | Howden | 35—46 |
| 2,412,130 | 12/1946 | Crouch | 35—46 |
| 2,546,764 | 3/1951 | McHose | 33—1 |
| 2,610,403 | 9/1952 | Valentine | 33—1 |
| 2,967,358 | 1/1961 | Fay et al. | 35—46 |
| 3,052,993 | 9/1962 | Olson | 35—46 |
| 3,133,359 | 5/1964 | Kurijama | 35—46 |

EUGENE R. CAPOZIO, *Primary Examiner.*

JEROME SCHNALL, *Examiner.*

HARLAND S. SKOGQUIST, *Assistant Examiner.*